(12) United States Patent
Bennett

(10) Patent No.: US 6,914,232 B2
(45) Date of Patent: Jul. 5, 2005

(54) DEVICE TO CONTROL LASER SPOT SIZE

(75) Inventor: Harold Earl Bennett, Ridgecrest, CA (US)

(73) Assignee: Bennett Optical Research, Inc., Ridgecrest, CA (US)

( * ) Notice: Subject to any disclaimer, the term of this patent is extended or adjusted under 35 U.S.C. 154(b) by 351 days.

(21) Appl. No.: 10/280,712

(22) Filed: Oct. 25, 2002

(65) Prior Publication Data

US 2004/0021054 A1 Feb. 5, 2004

Related U.S. Application Data

(60) Provisional application No. 60/339,527, filed on Oct. 26, 2001.

(51) Int. Cl.[7] .................................................. H01J 3/14
(52) U.S. Cl. ..................................... 250/216; 250/201.4
(58) Field of Search .............................. 250/216, 201.4, 250/203.4, 227.11; 359/244, 252, 291; 372/9, 12, 26

(56) References Cited

U.S. PATENT DOCUMENTS 4,141,652 A  *  2/1979  Feinleib ...................... 356/121

* cited by examiner

Primary Examiner—Que T. Le
(74) Attorney, Agent, or Firm—Kenneth G. Pritchard

(57) ABSTRACT

A fixed size laser beam spot is used to illuminate a solar array. The beam spot size is kept constant even though the distance to the solar array may vary by a factor of 100. The focal point of the mirror emitting the beam to the array is shifted to maintain a desired beam waist so the same spot size is incident on the array. Attached to the array is a centering device to direct the beam spot to be centered on the array.

32 Claims, 6 Drawing Sheets

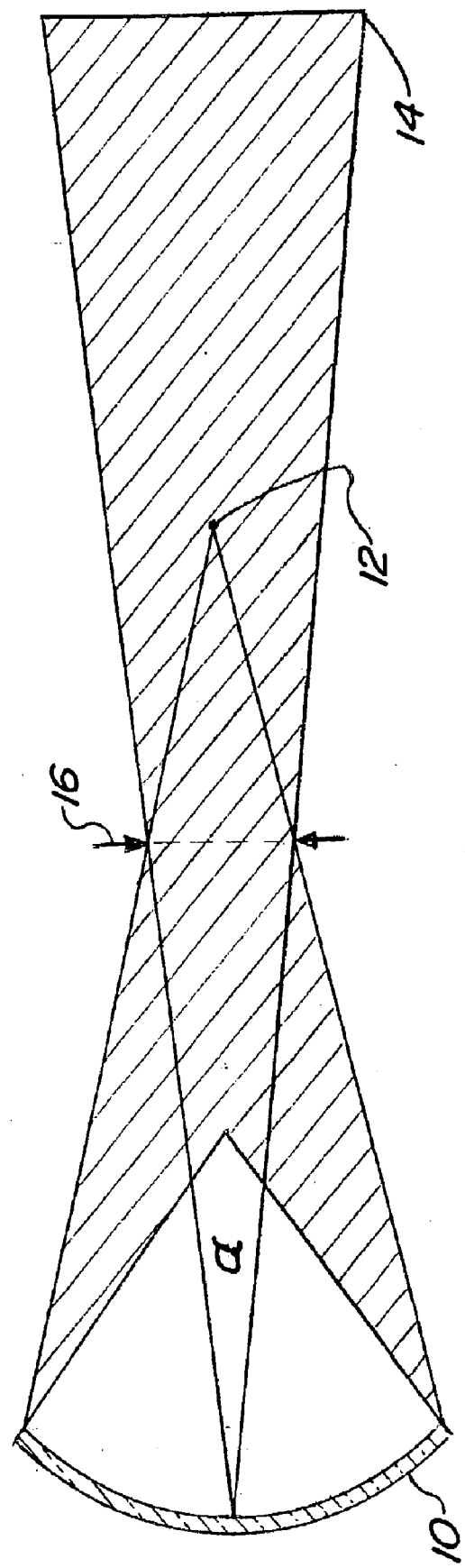
FIG.—1

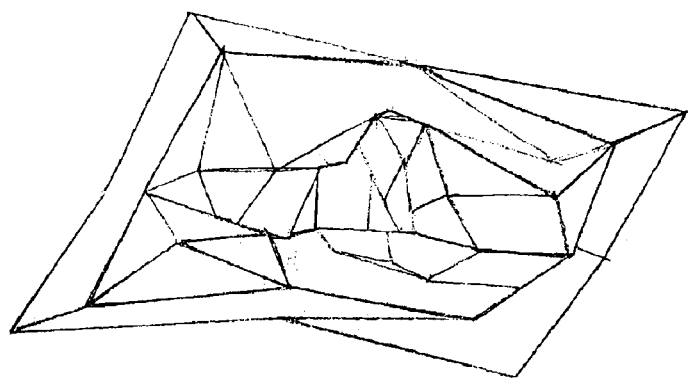
FIG.—2A
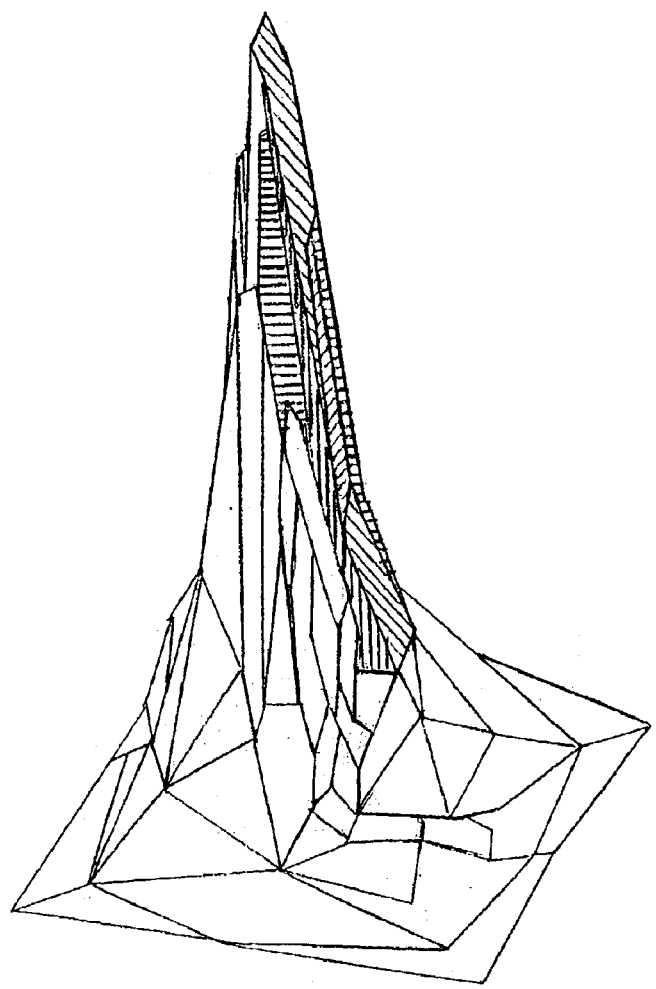
FIG.—2B

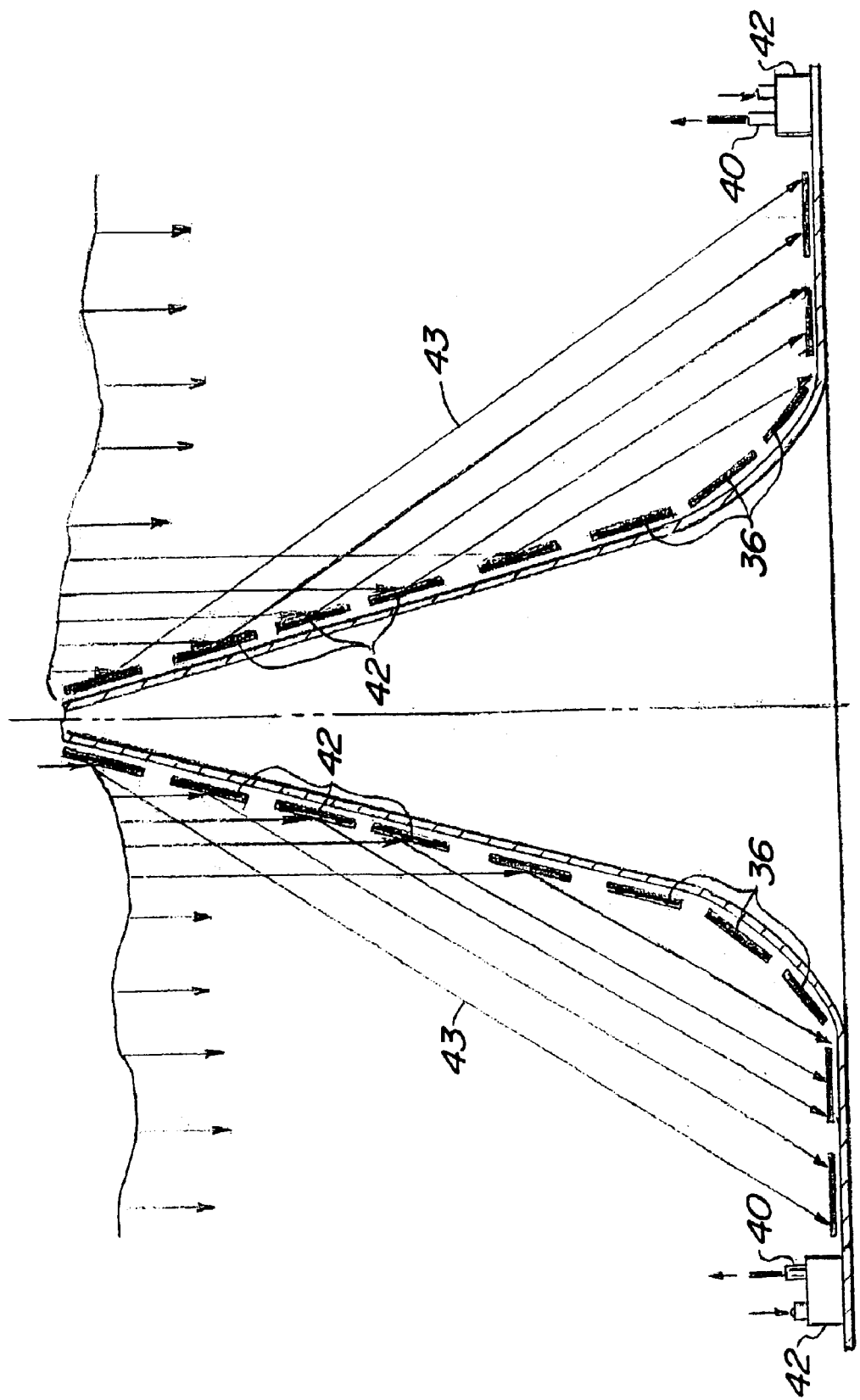
FIG.—6

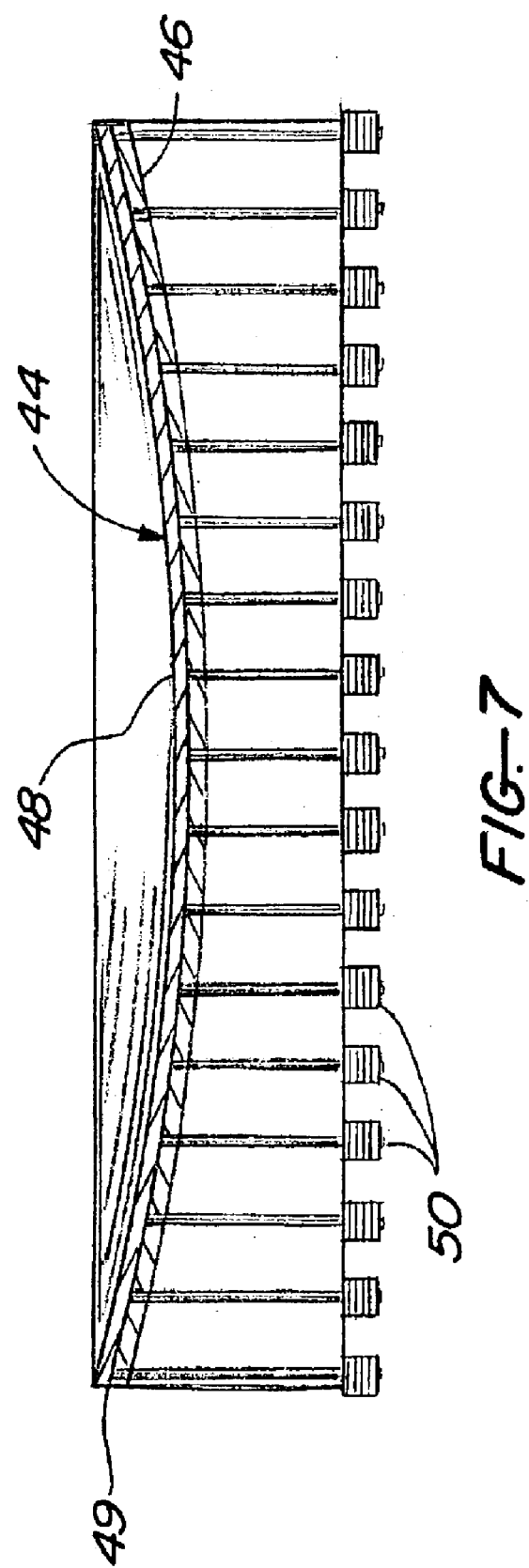

DEVICE TO CONTROL LASER SPOT SIZE

This application claims the benefit of provisional application 60/339,527 filed on Oct. 26, 2001.

BACKGROUND OF THE INVENTION

Description of Prior Art

Electrical power is a limiting factor for satellites. Solar panels have been used for decades to allow satellites to generate electrical power past what can be launched in batteries. Current solar cell capability is limited by the fact that the solar spectrum cannot be completely used to generate electrical power. Solar cells respond to a relatively small portion of that spectrum. To improve generation efficiency of electric power by solar panels it is needed to illuminate these panels with light of a narrow bandwidth. Lasers offer the ability to provide such a match of wavelength to solar cell response and also increase the total power available.

U.S. Pat. No. 6,285,690 to Kim et al provides a laser source suitable to provide the laser beam suitable to recharge satellites via current solar cell technology.

This laser beam is on earth and has to be sent to a satellite up to 40,000 km away. Geosynchronous satellites are in orbit 35,900 km above the earth's equator. At great distances the size of the laser spot is determined entirely by the coherent diameter of the beam director primary mirror from which the laser beam came. However, at distances from a few hundred kilometers to 40,000 kilometers the size of the laser spot must remain a constant diameter to fit the diameter of the solar cell array at all distances from low earth orbit to geosynchronous orbit.

If the laser spot size is not controlled accurately enough, it may become too small and the laser beam may ruin the solar panels of the satellite being irradiated. Conversely it may become too large, reducing the power transmitted to the solar panel.

For such long distances the attempt to control the beam diameter on the solar cells of the spacecraft by focusing the primary mirror may involve attempting to set the mirror to accuracies that are shorter than the telescope's focal range.

The spot size of a laser beam in space depends on the focal length and diameter of the projecting telescope, often called a beam projector, and on the lack of aberrations in the laser beam introduced by the laser, the optics or the atmosphere. If the aberrations are negligible then the beam diameter in the near field is determined by the diameter of the telescope entrance pupil and the position of the beam focus. If the beam is in the far field beyond the beam waist, then the beam spread, which is determined only by diffraction, (which is a function only of the diameter of the mirror) and does not depend on the mirror focal length. It is difficult to maintain the beam diameter at a constant size so that it always just fills the solar panel of a satellite as the satellite travels from low earth orbit (LEO) to geosynchronous earth orbit (GEO). It is done by constantly adjusting the focal point of the beam by amounts of a few millionths of a meter. To avoid damage the solar panel cannot be at the focus of the laser. At distances closer to the mirror than the beam waist, changing the focus affects the beam diameter. An ideal laser beam is illustrated in FIG. 1. A primary mirror 10 of diameter D has a geometrical focus point 12. For a given primary mirror 10 there is a diffraction limited beam 14. Where the ray tracings of diffraction limited beam 14 cross a ray trace of geometrical focus 12, a beam waist 16 is identified that has a fixed size for that focus 12. At distances closer to mirror 10 than beam waist 16, changing the focus affects the beam diameter. At distances greater than beam waist 16, the beam divergence is determined only by diffraction, which depends on mirror diameter D alone, and is not affected by the focal length or geometrical optics point of focus of the mirror. Beyond beam waist 16 the minimum beam diameter is given by $\alpha = 2.44 \lambda/D$ where $\alpha$ is the full angle of the diffraction-limited beam, $\lambda$ is the wavelength of the light and D is the diameter of the entrance pupil of the telescope, usually the diameter of the primary mirror of the telescope. When light is emitted from a telescope the telescope is referred to in the art as a beam projector.

Additional spreading of the beam may be caused by atmospheric distortion. FIG. 2A and FIG. 2B show a laser beam intensity profile. As the laser wavefront travels through the atmosphere different areas of the wavefront encounter turbulence caused by air at different temperatures. As it passes through this air the wavefront becomes distorted and does not maintain its initial intensity profile as shown in FIG. 2B. The profile is reduced to that shown in FIG. 2A. Astronomers know this phenomenon well, since it causes blurring of stellar objects. Even the best, most perfect telescopes, if uncompensated, will produce a somewhat fuzzy picture, since the aberrations are caused by the atmosphere, not the telescope itself. Under good conditions approximately 96% of this atmospheric aberration may be removed by use of adaptive optics. The clean Airy pattern in FIG. 2B then results at the satellite as a compensated wavefront. Using adaptive optics astronomers can form a sharp image of stellar phenomena. Both in the case of light coming into a telescope and light going out of the telescope the surface of the adaptive optic mirror is distorted to match the distorted wavefront 18, as seen in FIG. 3. Reflection of the wavefront by the adapted mirror surface 20 corrects its distortion, allowing it to maintain an Airy intensity distribution function and be focused to form a sharp image. The wavefront distortion of a laser spot projected through the atmosphere by reflection from adaptive mirror surface 20 is corrected by introducing the negative of the wavefront distortion it will develop in passing through the atmosphere. The atmosphere then corrects the aberrated wavefront and produces an unaberrated wavefront which can be brought by the beam projector to produce the desired spot size in space. This unaberrated spot size can be directed to fall on a solar panel and create electricity to power a satellite or a space vehicle.

FIELD OF THE INVENTION

This invention relates to a laser beam control including spot size. In particular it relates to laser beam control at long distances suitable for satellite distances from the surface of earth.

A further object of this invention is to focus an adaptive optic telescope or beam projector to produce a compensated desired spot size at a set distance in space and how to configure the receiving solar panel to accept it and transform it into electricity without overheating the solar panels.

SUMMARY OF THE INVENTION

The spot size of a laser beam reflected from a focusing mirror is varied by changing the position of the focus of the focusing mirror in object space. Actuators are mounted to the back of the focusing mirror faceplate.

The control of spot size allows the beam energy density to remain constant. For power beaming to satellites maintaining the constant spot size to both low earth orbits, geosynchronous earth orbits, and positions in between these limits allows constant energy transfer despite varying distances. The same principles will apply to deep space objects such as Mars mission or further planetary missions at greater distances.

The primary mirror should be the adaptive optic in a laser system since it is the largest area mirror in the system and therefore the least sensitive to laser-induced heating. In addition, an adaptive optic primary can be used to maintain the beam diameter at a constant size over large distances. The diameter of the beam striking the satellite is always the same even though distance to the satellite varies. The adaptive optic mirror may need to be 15 meters in diameter for the example used herein. To make such a size, use of one meter composite hexagon segments are connected with flat edge to flat edge. Each segment is phased with other composite one meter hexagons having excellent optical figures and very low scatter surfaces to make a 15 meter diameter coherent primary mirror or any other dimension desired. The primary mirror will have an influence function of approximately 2 to 4 cm, the distance between actuators. Two to four centimeters is comparable to the Fried coefficient for demanding environments. The actuators should have a response time of one thousandth of a second or less, the minimum response time observed for atmospheric disturbance.

Beam diameter may be varied by mounting the secondary mirror on a three axis precision linear stage.

BRIEF DESCRIPTION OF THE DRAWINGS

FIG. 1 is a cross sectional beam view parallel to the axis.

FIG. 2A and FIG. 2B are side to side comparisons of cross-sectional intensity of laser beams with and without compensating adaptive optics.

FIG. 6 shows the effect of a cone mounted solar cell array.

FIG. 7 is a side view of an adaptive optic mirror.

DESCRIPTION OF THE PREFERRED EMBODIMENT

Figure 3:
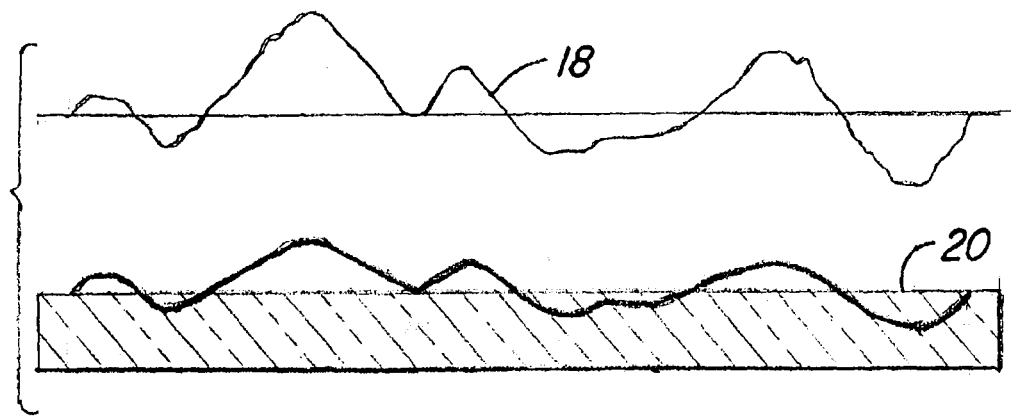
FIG. 3 shows an ideal matching of an adaptive optic mirror surface to a distorted wavefront.
Figure 4:
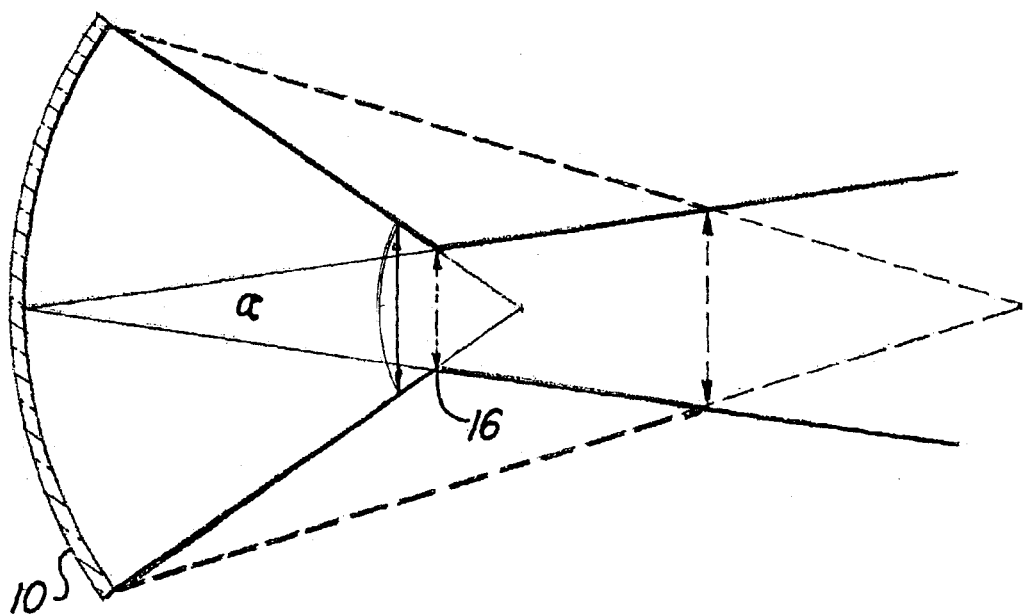
FIG. 4 shows the distance relationships for adjusting the laser beam spot size so it will remain a constant diameter at different distances.

Since a given solar panel is a fixed size, the light beam should be configured to be the same diameter independent of the distance of the solar panel from the telescope. A simple example of a calculation to achieve this outcome is given below. The separation of the solar panel from the telescope may vary from a few hundred kilometers to as much as 40,000 kilometers. Since the ultimate possible minimum size of the laser spot is fixed through diffraction of light by the diameter of the telescope primary mirror, the minimum telescope primary mirror diameter is determined by the maximum distance at which the satellite solar panel may be matched in diameter by the laser beam projected by the telescope. As seen in FIG. 4, this diameter is given by a simple analysis. If $\alpha$ is the full angle of the laser beam divergence, which is determined for an initially distortion-free laser beam by the diameter D of the primary mirror of the beam projector telescope, and $\lambda$ is the wavelength of the laser light, then $\alpha = 2.44\lambda/D$. As an example, assume a solar panel of 10 meters diameter. It is reasonable to require that the laser spot size be 6 meters in diameter to allow for pointing and tracking errors and errors in beam diameter compensation or other aberrations not entirely removed from the laser at the satellite beam. The minimum diameter of the beam projector primary mirror is $D=2.44 \lambda/\alpha$ where $\alpha=6/40,000,000 = 1.5 \times 10^{-7}$ steradians. If $\lambda=0.84$ micrometers (the wavelength of peak sensitivity of either silicon or gallium arsenide solar cells and at an atmospheric window) then $D=2.44 \times 0.84 \times 10^{-6}/1.5 \times 10^{-7} = 14$ meters in diameter.

The largest monolithic mirror in the world is 8 meters in diameter. It is so massive that in all probability no larger monolithic mirror will ever be built. By using one meter hexagonal mirror segments phased together, McDonald Observatory in Texas has mounted in the Hobby-Eberly telescope the largest telescope mirror yet made. It is of segmented mirror design, phased, 11 meters in diameter, and is thought to be the coming telescope design for future astronomical observatories. Using the same size one meter segments, a 15 meter telescope, rather than a 14 meter telescope just discussed, naturally results. As an example, then, let us assume that the primary mirror of a potential laser beam projector is of segmented construction and is 15 meters in diameter. To power a 10 meter diameter solar array, it must maintain a constant beam diameter over distances which differ by as much as 100 times. The solution to this problem is illustrated in FIG. 4. The maximum distance at which the laser beam can be equal to a 6 meter diameter, the assumed laser spot size, is determined by the size of the beam waist 16. That is determined by the telescope mirror divergence $\alpha$, which depends only on the diameter of the mirror and the wavelength. Beyond the 6 meter beam waist in the example discussed, the focal length of the mirror has no effect on the laser spot size. At shorter distances the focus can be shifted to maintain the 6 meter diameter spot in our example. At a distance labeled x on FIG. 4 the spot size is to be 6 meters. The focus is then at a distance q where from similar triangles $q=Dx/(D-6)$ where D=6 meters. Given x we can calculate q from this equation. From the thin lens equation $1/p+1/q=1/f$ where f is the focal length of the mirror, p is the effective object distance of the source, and q is the image distance. Solving the above equation for p is popularly given as $p=f+\delta p$ where $\delta p \approx f^2/q$. Given q and knowing the mirror focal length f we can calculate the distance away from the focus of the laser beam which would provide a spot size of 6 meters. This analysis can be performed at any distance less than or equal to the maximum distance. There is a caveat to that statement, however. The focal range of a lens or mirror is the distance along the mirror axis over which, according to diffraction theory, a change in focus is undetectable. The focal range of the primary mirror 10 is $\delta p' = 4\lambda f^2$ where f is the f-number of the mirror, defined as the focal length divided by the mirror diameter. If $\delta p < \delta'$, diffraction makes the setting indistinguishable from the focal length setting, which focuses the beam at infinity. If the f-number of the primary mirror is f/2, then at a wavelength of 0.84 $\mu$m the focal range is 3.4 $\mu$m. The focal length of the mirror is then 13.5 meters. At a distance of 40,000 km the value of $\delta p$ is then 12.7 $\mu$m, which is just outside the focal range of the mirror. At all distances up to 40,000 km the mirror can then be focused to put the 6 meter diameter focused spot on the solar panel at the satellite distance.

Figure 5B:
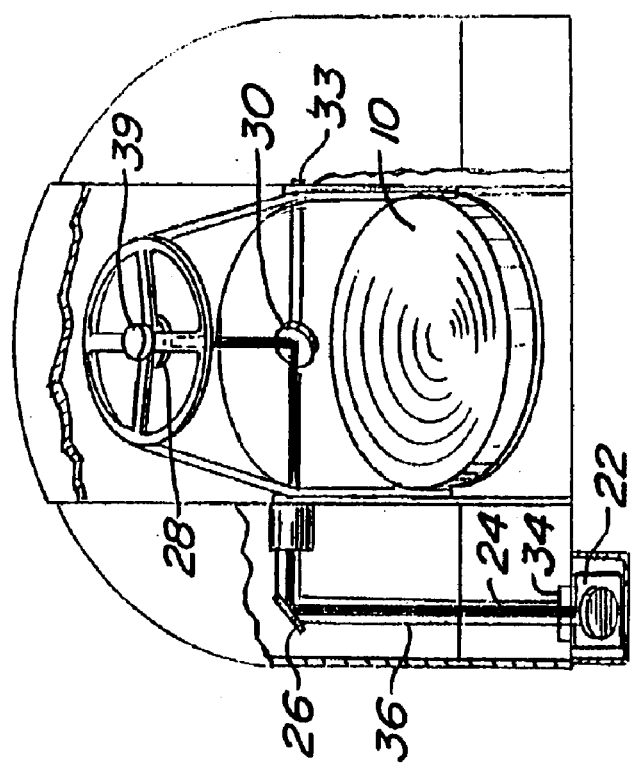
FIG. 5A and FIG. 5B show an example of the beam projector front and side views.
Figure 5A:
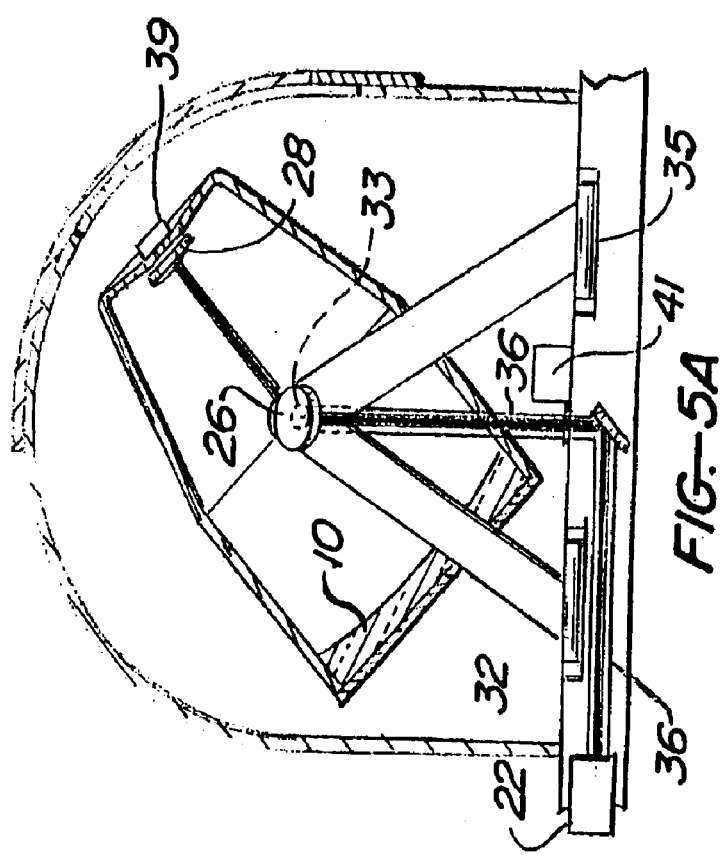

A generic form of the beam projector is shown in FIGS. 5A and 5B. FIG. 5A is a side view and FIG. 5B is a front view. A laser 22 emits laser beam 24 shown in FIG. 5B. A folding mirror 26 may be used to direct laser beam 24 into the optical cavity formed between secondary mirror 28 and primary mirror 10. The arrangement shown is known as a Nasmythe focus because the laser beam after being directed into the optical cavity is then directed by mirror 30 to secondary mirror 28 which in turn directs laser beam 24 to primary mirror 10. The advantage of the Nasmythe focus is that for large heavy mirrors mounts 32 permits the telescope or beam projector to pivot with the input/output path locked into place so it automatically stays in place when the mirrors pivot around pivot axis 33. Tracking mirrors may be used to maintain input as the beam projector rotates around track 35. Track 35 may be an air or hydrostatic bearing turntable. An alternate method to avoid tracking mirrors, not shown, is to have laser 22 alighted to input along the axis of rotation. Laser 22 may be a free electron laser with an output power of 200–1000 kW described in Kim et al U.S. Pat. No. 6,285,690, although this application is not limited to that laser. That laser output has a diameter of a few mm, and while traveling in an ultrahigh vacuum such a laser beam expands through diffraction to about a meter in diameter. It then passes through a fluoride glass window 34 shown in FIG. 5B, which has the property that it does not develop hot spots caused by laser heating. Once it exits the window the beam cannot be brought to a focus in the beam train or air breakdown will result. An adaptive optic mirror such as those available from Bennett Optical Research is primary mirror 10 in FIG. 5A. It is used to change the plane wave of the emitted laser beam to a distorted wavefront that is brought back into focus by passing through a distorting medium. In this example the distorting medium is the earth's atmosphere. A laser tube 36 shown in FIG. 5A shows an entrance path for laser beam 24 beneath rotation track 35.

The nearly parallel laser beam strikes the secondary mirror 28, which is convex, and is reflected to primary mirror 10 and then to the satellite or OTV in space. The focus of primary mirror 10 is virtual, which prevents air breakdown. The virtual focal point is outside the optical cavity behind secondary mirror 28. The minute changes in focus required as the satellite moves farther out in space are achieved by moving secondary mirror 28 by focusing means 39. Focusing means 39 may be a precision three axis drive which are commercially available. Alternate designs are possible other than that shown in FIG. 5. For example a Cassegrain will also work.

Changes in focus are very important as the satellite moves farther away in space. Unless the focus is set accurately, the intensity of the laser beam on the solar panel may be sufficient to damage the solar panel. The beam projector shown in FIG. 5 employs a virtual focal point to avoid the air breakdown that would occur if the laser beam were brought to a real focus in air.

Rejection of heat generated in the solar cells by the laser is a challenge. Approximately 52% of the incident laser light is changed into electricity, and thus only about ¼th of the incident energy goes into laser heating, as compared to ⅔rds of the incident energy which goes into heating when the same cells are exposed to solar energy. With proper design, thermal back-loading of heat to the main spacecraft is negligible. If laser power levels of 0.137 W/cm² are met, the relative change in efficiency to be expected in gallium arsenide solar cells would be −0.2% per ° C. change in cell temperature. For gallium arsenide the cell survival maximum temperature is 380° C. Various heat rejection schemes have been considered. They include beam wavering, achieved through using alternate stringing techniques to prevent current limiting and consequent power loss; solar cell type; distribution; packing; improving thermal substrate conductance; backside fins mounted on the solar arrays for increased radiative transfer; and heat pipes. They were evaluated in part using a program developed for thermal heating of solar panels for NASA. None of these techniques were effective in significantly reducing the increase in heating of solar panels.

There are differences between the solar irradiation of solar panels and laser irradiation. First, in laser irradiation about three times as much of the laser energy incident on solar panels is converted into electricity as if solar energy is used. There is thus less energy available for thermal heating. Second, the sun's energy intensity is uniformly distributed over space objects with a solar constant of 1.4 kW/m², whereas laser energy is sharply peaked in intensity. One way to reduce localized heating of the solar cells by a laser beam is to tilt the cells so that the laser beam strikes them at a large angle of incidence. The intensity I received per unit area of solar cell is then reduced by the cosine of the angle of incidence. The intensity of laser light on the cell is given by $I=I_o \cos \theta$ where $\theta$ is the angle of incidence of light onto the solar cell and $I_o$ the incident laser intensity for normal incidence. If the Airy function is simulated in the center of a solar array, the power levels incident on all of the solar cells are approximately equal. The string lengths then all have the same number of solar cells, and the power level on the cell at the most intense point on the Gaussian beam is reduced by a factor of five. Solar cells 42 may be mounted on a cone as shown in FIG. 6. The theoretical curve is given by the expression for the Airy pattern which to a good approximation is conical.

There will be some light reflected from the inclined solar cells as shown by arrows 43. The solar cell array could be extended to absorb this reflected light, thus approximately equalizing the absorbed flux on these cells and on the tilted cells. A one megawatt laser could be usefully be employed in powering a solar array 10 meter in diameter and containing a gallium arsenide solar array.

Pointing at and tracking the preselected target, say a solar array, would be greatly enhanced if the solar array on the preselected target had a reporting device. This could be accomplished if it carried at least one diode laser as a beacon to the ground. Also the position of the laser beam on the array could be relayed to earth by sensors 40 on the solar cell array. The number of sensors 40 is a design choice, four to six evenly distributed about the circumference of the solar array are practical. These sensors 42 by conventional means could effect the diode laser signal to guide the incident laser beam to be centered on the solar array. This is a form of a missile homing device which are well known in the art. In FIG. 5A, an aiming device 41 is operably connected to controls for pivot 33 and rotation track 35 to steer the output beam.

FIG. 7 is a side view of an adaptive optic mirror usable for primary mirror 10. A faceplate 44 which can be 0.6 to 0.8 mm. thick made of composite material is held in close proximity to a backing plate 46 which may be made of the same composite material. Thickness will vary as desired. Composite material has a low expansion coefficient, good dimensional stability, and low water absorption. Water absorption can be 0.04% as compared to 2% for graphite epoxy. Faceplate 44 has a coat 48 which may be a protected silver coating or similar material. Coat 48 provides protection which is very tarnish-resistant, has a higher reflectance than aluminum throughout the near infrared, and unlike aluminum is not attacked by a salt-laden atmosphere.

A plurality of actuators 50 are mounted to backing plate 46. Actuators 50 operate on hollow push-rods fastened to the faceplate with an adhesive that does not distort the thin faceplate material.

Such an adaptive optic mirror may be formed by casting the composite faceplate against a superpolished 48" mandrel of ULE quartz or similar material. This domestically produced material has an expansion coefficient of 0.03 ppm/° K at room temperature, and is thus a good match for the reported 0.05 ppm/° K expansion coefficient of the composite ester. Strains in the composite mirror induced by a large mismatch in expansion coefficients of the composite shell and the mandrel will thus be minimized. Previous vendor experience suggests that about 50 castings can be made on a well-polished mandrel before it needs repolishing.

An example of the composite material that can be used is graphite fiber impregnated cyanate ester resin. This remarkable composite material accurately replicates the shape of a mandrel against which it is cast. Optical figures good to one twentieth of a wave with low scatter surfaces below 10 Å rms have been reported. Thin composite mirrors of 0.9 meter or more have been cast and successfully separated from the mandrel. The graphite impregnated cyanate ester resin has a remarkably low expansion coefficient for an organic material. Its thermal expansion coefficient, $0.05 \times 10^{-6}$ is comparable to those of Zerodur and ULE quartz, the lowest expansion coefficient materials known. Figure distortion with temperature change as the mirror heats or cools will thus be minimal. The mandrel should be made out of the Zerodur or ULE quartz, since heat is required in the fabrication process. If during fabrication the mandrel changes shape more rapidly than the composite faceplate, strains and distortion will be introduced in the faceplate. The space 49 between faceplate 44 and backing plate 46 may be 15 to 25 μm for air or viscous damping.

Other means to direct the beam may be used. Any aiming device, not shown, such as radar orbital timing with clock drive and so forth, all well known in the art may be used to direct the beam to the satellite.

What is claimed is:

1. A beam projector to maintain constant laser spot size over long distances to illuminate a preselected target comprising:
   A. A laser source of predetermined wavelength and intensity emitting a laser beam;
   B. an adaptive optic system placed in the path of said emitted laser beam for changing the wavefront of said laser beam to allow for distortions anticipated in a plane wave front of said emitted laser beam sent to a preselected target via a distorting medium;
   C. focusing means connected to said adaptive optic system such that the spot size of said changed emitted laser beam will be kept relatively constant as the distance to said preselected target varies; and
   D. aiming means operably connected to said adaptive optic system to direct said changed laser beam to said preselected target.

2. A beam projector to maintain constant laser spot size over long distances to illuminate a preselected target as described in claim 1 where said aiming means further comprises a reporting device on said preselected target which gives both the position of the preselected target and whether said laser spot is centered on said preselected target and steering means to direct said changed laser beam's direction such that it is centered on said preselected target.

3. A beam projector to maintain constant laser spot size over long distances to illuminate a preselected target as described in claim 1 where said laser source comprises a free electron laser.

4. A beam projector to maintain constant laser spot size over long distances to illuminate a preselected target as described in claim 2 where said laser source comprises a free electron laser.

5. A beam projector to maintain constant laser spot size over long distances to illuminate a preselected target as described in claim 1 where said focusing means comprises a precision three axis linear drive.

6. A beam projector to maintain constant laser spot size over long distances to illuminate a preselected target as described in claim 2 where said focusing means comprises a precision three axis linear drive.

7. A beam projector to maintain constant laser spot size over long distances to illuminate a preselected target as described in claim 3 where said focusing means comprises a precision three axis linear drive.

8. A beam projector to maintain constant laser spot size over long distances to illuminate a preselected target as described in claim 4 where said focusing means comprises a precision three axis linear drive.

9. A beam projector to maintain constant laser spot size over long distances to illuminate a preselected target as described in claim 1 where said adaptive optic system further comprises a virtual focus mirror arrangement.

10. A beam projector to maintain constant laser spot size over long distances to illuminate a preselected target as described in claim 2 where said adaptive optic system further comprises a virtual focus mirror arrangement.

11. A beam projector to maintain constant laser spot size over long distances to illuminate a preselected target as described in claim 3 where said adaptive optic system further comprises a virtual focus mirror arrangement.

12. A beam projector to maintain constant laser spot size over long distances to illuminate a preselected target as described in claim 4 where said adaptive optic system further comprises a virtual focus mirror arrangement.

13. A beam projector to maintain constant laser spot size over long distances to illuminate a preselected target as described in claim 5 where said adaptive optic system further comprises a virtual focus mirror arrangement.

14. A beam projector to maintain constant laser spot size over long distances to illuminate a preselected target as described in claim 6 where said adaptive optic system further comprises a virtual focus mirror arrangement.

15. A beam projector to maintain constant laser spot size over long distances to illuminate a preselected target as described in claim 7 where said adaptive optic system further comprises a virtual focus mirror arrangement.

16. A beam projector to maintain constant laser spot size over long distances to illuminate a preselected target as described in claim 8 where said adaptive optic system further comprises a virtual focus mirror arrangement.

17. A beam projector to maintain constant laser spot size over long distances to illuminate a preselected target having an approximately conical shaped solar cell array, said solar cell array configured to the intensity distribution of the Airy function pattern of said constant laser spot size comprising:
   A. A laser source of predetermined wavelength and intensity emitting a laser beam;
   B. an adaptive optic system placed in the path of said emitted laser beam for changing the wavefront of said laser beam to allow for distortions anticipated in a plane wave front of said emitted laser beam sent to a preselected target via a distorting medium;
   C. focusing means connected to said adaptive optic system such that the spot size of said changed emitted laser beam will be kept relatively constant as the distance to said preselected target varies; and D. aiming means operably connected to said adaptive optic system to direct said changed laser beam to said preselected target.

18. A beam projector as described in claim 17 where said aiming means further comprises a reporting device on said preselected target which gives both the position of the preselected target and whether said laser spot is centered on said preselected target and steering means to direct said changed laser beam's direction such that it is centered on said preselected target.

19. A beam projector as described in claim 17 where said laser source comprises a free electron laser.

20. A beam projector as described in claim 18 where said laser source comprises a free electron laser.

21. A beam projector as described in claim 17 where said focusing means comprises a precision three axis linear drive.

22. A beam projector as described in claim 18 where said focusing means comprises a precision three axis linear drive.

23. A beam projector as described in claim 19 where said focusing means comprises a precision three axis linear drive.

24. A beam projector as described in claim 20 where said focusing means comprises a precision three axis linear drive.

25. A beam projector as described in claim 17 where said adaptive optic system further comprises a virtual focus mirror arrangement.

26. A beam projector as described in claim 18 where said adaptive optic system further comprises a virtual focus mirror arrangement.

27. A beam projector as described in claim 19 where said adaptive optic system further comprises a virtual focus mirror arrangement.

28. A beam projector as described in claim 20 where said adaptive optic system further comprises a virtual focus mirror arrangement.

29. A beam projector as described in claim 21 where said adaptive optic system further comprises a virtual focus mirror arrangement.

30. A beam projector as described in claim 22 where said adaptive optic system further comprises a virtual focus mirror arrangement.

31. A beam projector as described in claim 23 where said adaptive optic system further comprises a virtual focus mirror arrangement.

32. A beam projector as described in claim 24 where said adaptive optic system further comprises a virtual focus mirror arrangement.

* * * * *